D. P. SHARP.
HORSE-RAKES.
No. 184,267. Patented Nov. 14, 1876.
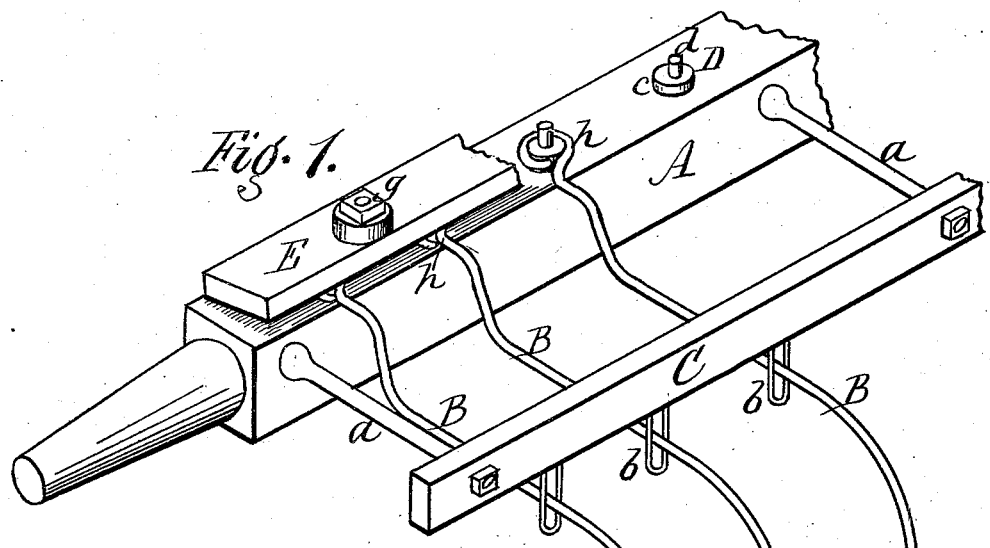
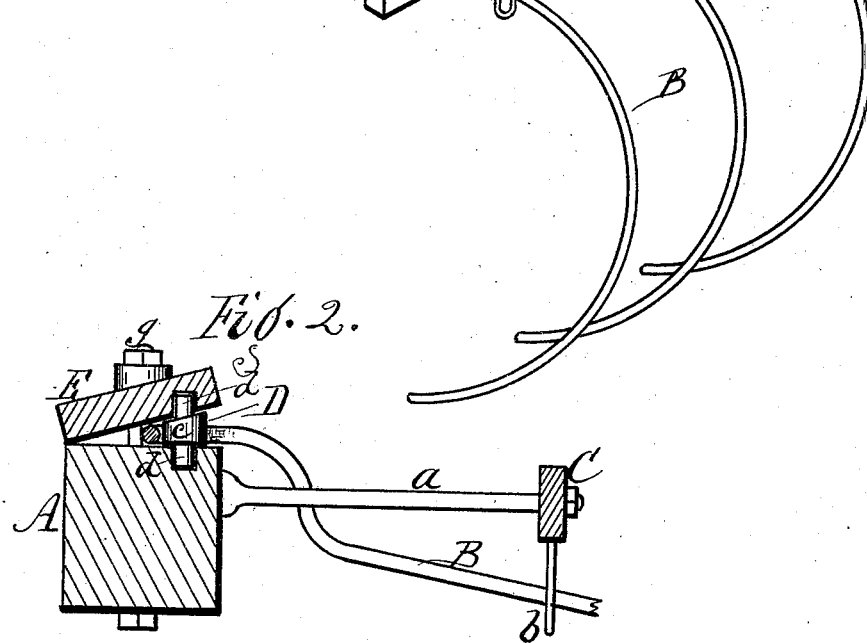
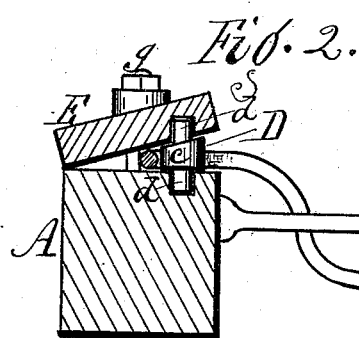
Witnesses.
Edwin Scott
Jacob Spahr
Inventor.
Dennis P. Sharp,
pr R. F. Osgood,
Atty.

UNITED STATES PATENT OFFICE.

DENNIS P. SHARP, OF ITHACA, NEW YORK.

IMPROVEMENT IN HORSE-RAKES.

Specification forming part of Letters Patent No. 184,267, dated November 14, 1876; application filed September 4, 1876.

*To all whom it may concern:*

Be it known that I, DENNIS P. SHARP, of Ithaca, in the county of Tompkins, and State of New York, have invented a certain new and useful Improvement in Horse-Rakes; and I do hereby declare that the following is a full, clear, and exact description of the construction and operation of the same, reference being had to the accompanying drawings, in which—

Figure 1 is a perspective view of the axle of a horse-rake provided with my improvement. Fig. 2 is a cross-section of the same. Fig. 3 is a detail view.

My improvement relates to the means for securing the teeth to the axle in horse-rakes, and consists in the construction and arrangement of parts hereinafter more fully described.

A is the axle, which is of ordinary construction. B B are the teeth. C is the tooth-holding bar, attached to the rear of the axle by arms $a$ $a$, and provided with staples $b$ $b$, which hold the teeth in position and allow them to rise and fall in passing over irregularities.

The teeth are attached as follows: D D are metallic bearings, each constructed with a central hub, $c$, and two projecting pins, $d$ $d$. The hub is of circular form, and is angular or beveled on top. The pins $d$ $d$ rest, respectively, in holes formed in the top of the axle and the bottom of a clamp, E, which extends longitudinally of the axle, and is bolted thereon by bolts $g$ $g$. The rear edge of the clamp rests on the beveled tops of the hubs $c$ $c$, as shown, leaving a clear space at the rear, between the clamp and the axle. $h$ $h$ are horizontal eyes formed on the upper ends of the teeth, by bending them around in proper form. These eyes fit closely, but loosely, around the hubs $c$ $c$, and rest in the open space between the clamp and the axle.

The advantage in this invention consists in the extreme simplicity and cheapness of the attachment. The bearings $d$ $d$ can be made of cast-iron. The holes in the axle and clamp are readily bored to receive the pins. The eyes on the ends of the teeth are formed without trouble. When the clamp is bolted down, the teeth are all secured. The angular open space between the clamp and the axle at the rear allows the proper vertical play of the teeth in passing over inequalities, while the front end of the eye of the tooth is so closely confined that it cannot rise. Free lateral movement of the eye around the hub is also allowed, sufficient to prevent binding. The flat form of the tooth between the clamp and axle prevent axial turning of the tooth. The teeth may be attached to a bar in the rear of and independent of the axle, if desired, in the same manner, instead of being attached to the axle itself.

By the means above described I avoid the complicated and expensive attachments now in use, and make the arrangement simple and effective.

What I claim herein as new is—

1. The bearing D, constructed with the hub $c$, to receive the eye of the tooth, and the projecting pins $d$ $d$, to rest in the axle and clamp, as herein shown and described.

2. In combination with the bearings D D, resting in sockets of the axle, and the teeth B B, provided with eyes resting around the bearings, the clamp E, extending longitudinally of the axle and secured thereto by bolts, so as to rest on top the bearings and secure the teeth in place, leaving a space for the vertical play of said teeth, as shown and described, and for the purpose specified.

In witness whereof I have hereunto signed my name in the presence of two subscribing witnesses.

D. P. SHARP.

Witnesses:
 R. F. OSGOOD,
 EDWIN SCOTT.